United States Patent
Arseneau (10) Patent No.: US 8,473,253 B2
(45) Date of Patent: Jun. 25, 2013

(54) DIGITAL EVENT TIMING

(75) Inventor: Roger E. Arseneau, Buffalo Grove, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 376 days.

(21) Appl. No.: 12/908,907

(22) Filed: Oct. 21, 2010

(65) Prior Publication Data

US 2012/0101779 A1 Apr. 26, 2012

(51) Int. Cl.
*G06F 17/10* (2006.01)
*G06F 17/40* (2006.01)
*G06F 19/00* (2011.01)

(52) U.S. Cl.
USPC ............................ 702/189; 702/187; 708/200

(58) Field of Classification Search
USPC .............. 73/732.1, 865.8; 250/305, 306, 307, 250/336.1, 358.1, 395, 580; 324/76.11, 113; 346/20, 25; 377/1, 6, 13, 19; 702/1, 22, 32, 702/127, 128, 187, 189; 708/100, 105, 200
IPC ............ G06F 11/00,11/30, 11/32, 17/00, 17/10, G06F 17/18, 17/40, 19/00
See application file for complete search history.

(56) References Cited

U.S. PATENT DOCUMENTS

| | | | | | |
|---|---|---|---|---|---|
| 2,560,166 | A | * | 7/1951 | Glenn, Jr. .......................... | 377/19 |
| 2,577,106 | A | * | 12/1951 | Coleman ....................... | 250/395 |
| 2,642,527 | A | * | 6/1953 | Kelley ............................. | 327/69 |
| 2,736,802 | A | * | 2/1956 | Cranberg ........................... | 315/1 |
| 2,829,269 | A | * | 4/1958 | Peacock et al. ............... | 250/369 |
| 2,917,729 | A | * | 12/1959 | Ferre ......................... | 250/336.1 |
| 3,270,205 | A | * | 8/1966 | Ladd et al. ...................... | 327/70 |
| 3,416,080 | A | * | 12/1968 | Wright et al. ............... | 324/76.16 |
| 5,847,395 | A | | 12/1998 | Malmin et al. | |
| 6,751,566 | B2 | * | 6/2004 | Sugai .............................. | 702/70 |
| 7,115,880 | B2 | | 10/2006 | Arseneau | |
| 7,601,937 | B2 | * | 10/2009 | Anton et al. ................... | 250/207 |
| 7,807,973 | B2 | * | 10/2010 | Mott ............................ | 250/362 |
| 7,855,370 | B2 | * | 12/2010 | Mott ........................... | 250/370.06 |
| 2002/0107670 | A1 | * | 8/2002 | Sugai ........................... | 702/189 |
| 2005/0274891 | A1 | * | 12/2005 | Arseneau ................... | 250/336.1 |
| 2008/0033673 | A1 | * | 2/2008 | Anton et al. .................... | 702/70 |
| 2009/0032715 | A1 | * | 2/2009 | Mott .......................... | 250/363.01 |
| 2009/0313313 | A1 | * | 12/2009 | Yokokawa et al. ........... | 708/300 |
| 2010/0027747 | A1 | * | 2/2010 | Mott ............................... | 378/82 |

* cited by examiner

*Primary Examiner* — Edward Cosimano
(74) *Attorney, Agent, or Firm* — Peter Kendall (57) ABSTRACT

Methods, computer-readable mediums, and a circuit are provided. In one embodiment, a method is provided which obtains a digital sample. The method calculates a second derivative of the digital sample and thereafter determines when the second derivative passed through a zero crossing point. A master clock value and the second derivative value before and after the second derivate passes through zero are used to calculate a clock fraction and add the clock fraction to the master clock value. Thereafter, an event start signal is triggered to initiates signal processing.

17 Claims, 7 Drawing Sheets

FIG. 7

DIGITAL EVENT TIMING

FIELD

Embodiments herein generally relate to nuclear medicine, and systems for obtaining images of a patient's body organs of interest. In particular, the present invention relates to a novel procedure and system for detecting the occurrence of valid scintillation events.

DESCRIPTION OF THE RELATED ART

Nuclear medicine is a unique medical specialty wherein radiation is used to acquire images that show the function and anatomy of organs, bones or tissues of the body. Radiopharmaceuticals are introduced into the body, either by injection or ingestion, and are attracted to specific organs, bones or tissues of interest. Such radiopharmaceuticals produce gamma photon emissions that emanate from the body. One or more detectors are used to detect the emitted gamma photons, and the information collected from the detector(s) is processed to calculate the position of origin of the emitted photon from the source (i.e., the body organ or tissue under study). The accumulation of a large number of emitted gamma positions allows an image of the organ or tissue under study to be displayed.

Emitted gamma photons are typically detected by placing a scintillator over the region of interest. Such scintillators are conventionally made of crystalline material such as NaI(Tl), which interacts with absorbed gamma photons to produce flashes of visible light. The light photons emitted from the scintillator crystal are in turn detected by photosensor devices that are optically coupled to the scintillator crystal, such as photomultiplier tubes. The photosensor devices convert the received light photons into electrical pulses whose magnitude corresponds to the amount of light photons impinging on the photosensitive area of the photosensor device.

Not all gamma interactions in a scintillator crystal can be used to construct an image of the target object. Some of the interactions may be caused by gamma photons that were scattered or changed in direction of travel from their original trajectory. Thus, one conventional method that has been used to test the validity of a scintillation event is to compare the total energy of the scintillation event against an energy "window" or range of expected energies for valid (i.e., unscattered) events. In order to obtain the total energy of the event, light pulse detection voltage signals generated from each photosensor device, as a result of a single gamma interaction, must be accurately integrated from the start of each pulse, and then added together to form an energy signal associated with a particular event. Energy signals falling within the predetermined energy window are considered to correspond to valid events, while energy signals falling outside of the energy window are considered to correspond to scattered, or invalid events, and the associated event is consequently not used in the construction of the radiation image, but is discarded. Without accurate detection of the start of an event, the total energy value may not be accurate, which would cause the signal to fall outside of the energy window and thereby undesirably discard a useful valid event.

Another instance of inaccurate information may arise when two gamma photons interact with the scintillation crystal within a time interval that is shorter than the time resolution of the system (in other words the amount of time required for a light event to decay sufficiently such that the system can process a subsequent light event as an independent event), such that light events from the two gamma interactions are said to "pile up," or be superposed on each other. The signal resulting from a pulse pile-up would be meaningless, as it would not be possible to know whether the pulse resulted from two valid events, two invalid events, or one valid event and one invalid event.

Different solutions to the pulse pile-up problem are known in the prior art. One such solution involves the use of pile-up rejection circuitry, which either precludes the detector from processing any new pulses before processing has been completed on a prior pulse, or stops all processing when a pile-up condition has been identified. This technique addresses the problem of post-pulse pile-up, wherein a subsequent pulse occurs before processing of a pulse of interest is completed. Such rejection circuitry, however, may undesirably increase the "deadtime" of the imaging system, during which valid gamma events are being received but are not able to be processed, thereby undesirably increasing the amount of time needed to complete an imaging procedure.

Another known technique addresses the problem of prepulse pile-up, wherein a pulse of interest is overlapped by the trailing edge or tail of a preceding pulse. This technique uses an approximation of the preceding pulse tail to correct the subsequent pulse of interest. Such approximation is less than optimal because it is not accurate over the entire possible range of pile-up conditions. Further, it requires knowledge as to the precise time of occurrence of the preceding pulse, which is difficult to obtain using analog signals. Additionally, this technique consumes a large amount of computational capacity.

Yet another problem encountered in the conventional detection and processing of valid light events is the effect of signal noise on accurate event location processing. In particular, direct current (DC) drifts or other sources of noise may alter the signals from the photosensor devices significantly enough to cause the calculation of the spatial location of an event to be unacceptably inaccurate.

A known prior art solution to this problem is disclosed in commonly assigned U.S. Pat. No. 5,847,395 (hereinafter referred to as the "'395 patent"), which is incorporated by reference herein in its entirety. The '395 patent discloses the use of a flash analog-to-digital converter (FADC) associated with each photosensor device (e.g., a photomultiplier tube (PMT)) and a data processor that integrates the FADC output signals, generates a fraction of a running sum of output signals, and subtracts the fraction from the integrated output signals to generate an adjustment signal to correct the output signals for baseline drifts. However, this solution does not address the pile-up problem as it is concerned with energy-independent locational computation.

Therefore, there exists a need in the art for a solution that eliminates the effects of system and event-related noise as well as addresses the problem of pulse pile-up.

SUMMARY

These and other deficiencies of the prior art are addressed by embodiments of the present invention, which generally relates to nuclear medicine, and systems for obtaining images of a patient's body organs of interest. In one embodiment, a method is provided which obtains a digital sample. The method calculates a second derivative of the digital sample and thereafter determines when the second derivative passed through a zero crossing point. A master clock value and the second derivative value before and after the second derivate passes through the zero crossing point are used to calculate a clock fraction and add the clock fraction to the master clock value. Thereafter, an event start signal is triggered that initiates signal processing.

According to another embodiment, a computer-readable medium having stored thereon a plurality of instructions, the plurality of instructions which, when executed by a processor, cause the processor to perform various steps is provided. In this embodiment, a digital sample of an energy signal from a nuclear imaging detector is obtained. A second derivative of the digital sample is calculated. After the second derivative has reached a maximum value a determination is made when the second derivative has passed through the zero crossing point. Thereafter, a master clock value, and the second derivative before and after the second derivative passed through the zero crossing point are retrieved. A clock fraction is calculated and added to the master clock value to obtain an event start and event start time for accurate association with data from a corresponding detector.

According to yet another aspect of the invention, a circuit for determining the start time of a gamma interaction in a nuclear imaging detector, is described herein. The circuit includes a first circuit adapted to obtain a digital sample of an energy signal from a nuclear imaging detector. In the circuit, there are sub-circuits adapted to calculate a second derivative of the digital sample; to determine, after reaching a maximum value, when the second derivative has passed through a zero crossing point; retrieve a master clock value and the second derivative value before and after the second derivative passes through the zero crossing point, calculate a clock fraction and the clock fraction to the master clock value; and trigger, upon said determination that the second derivative has passed through the zero crossing point, an event start signal that initiates signal processing of signals from said nuclear imaging detector.

Other embodiments are also provided herein which utilize the second derivative of a digital sample to calculate a fraction of the master clock time (and add the fraction to the master clock time) for a more accurate determination of an even.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Aspects of this disclosure are described herein with respect to a pairing of events in PET systems. However, the description provided herein is not intended in any way to limit the invention to PET systems. Aspects of the material disclosed herein may be utilized in other imaging technologies (e.g., SPECT systems, etc.).

In the current digital event detection used in the FORSIGHT detector (U.S. Pat. No. 7,115,880 B2) the point where the second derivative of the digitized energy signal of the event goes from positive to negative is used to determine the clock cycle in which the event started. This point is after the event start but is always a fixed number of cycles after the start so the real start can be determined by subtracting the fixed number from the determined cycle. The relative timing is all that is needed as events are compared to each other and the fixed delay cancels out.

This produces a number between 0 and 1 that is added to the clock number when the second derivative was SD_value_clk_(N). This produce a fractional value between clock cycles for the event start time. Other methods of interrelation can be used to find the crossing point.

As an example, if a 160 mhz is used to digitize the event energy signal, the starting point in the prior art can be determined to a timing accuracy of the clock period or $\frac{1}{160}$ mhz or 6.25 ns. In accordance with embodiments disclosed herein, if the crossing point is calculated to $\frac{1}{64}$ of a clock cycle the timing accuracy is 6.25 ns/64 or 0.098 ns.

Figure 1:
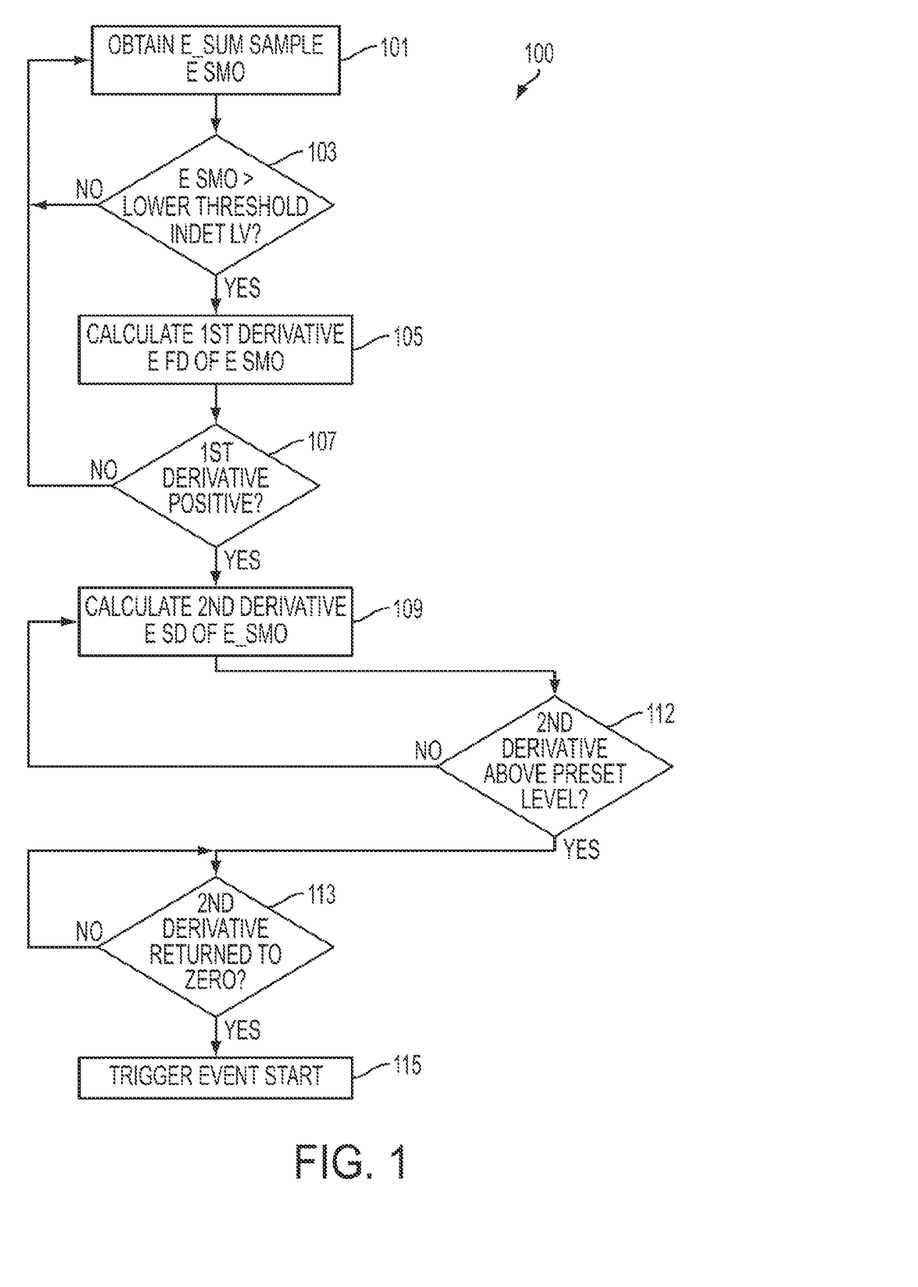
FIG. 1 depicts a flow diagram of an exemplary method according to an embodiment in accordance with this disclosure.

FIG. 1 depicts a method 100 for detecting the occurrence of a light event. The method involves the use of a digital energy signal E_SUM to detect the start of a light event in a scintillator. Such digital energy signal E_SUM is readily obtainable by connecting all of the outputs of the photosensor devices of the system to a summing amplifier, and feeding the output of the summing amplifier to a flash analog-to-digital converter (FADC) as disclosed in the aforementioned '395 patent. Accordingly, no further description of the E_SUM signal will be made, other than to note that in accordance with a preferred embodiment of the invention, the digital E_SUM signal outputted from the FADC is a 12-bit signal sampled at a rate of 160 MHz. In addition, this application incorporates by reference all of the material within U.S. Pat. No. 7,115,880 issued Oct. 3, 2006. Other FADC may be used dependent on the precession required such as a 14-bit signal sampled at a rate of 500 MHz.

Figure 2:
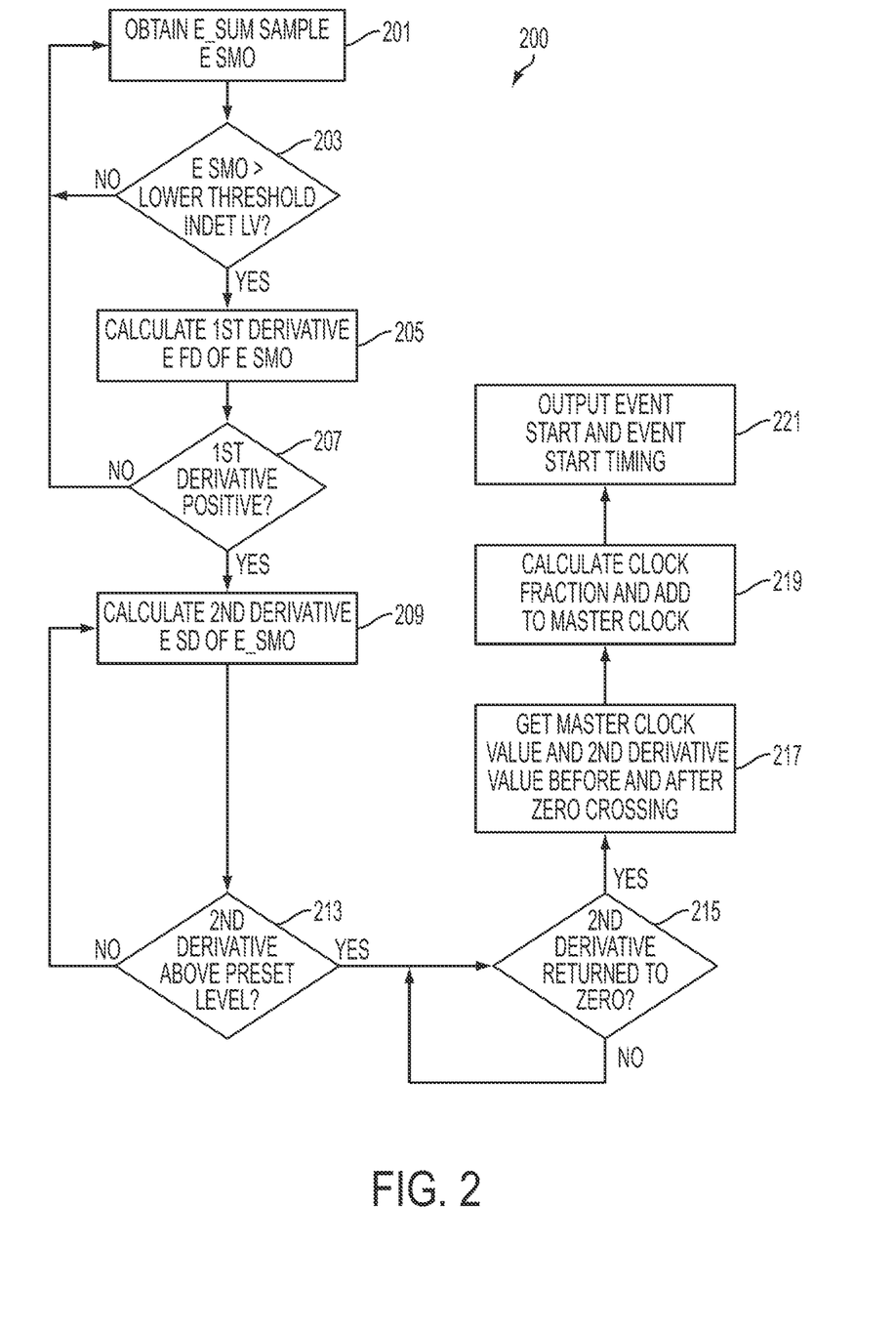
FIG. 2 depicts a flow diagram of an exemplary method according to another embodiment in accordance with this disclosure.
Figure 3:
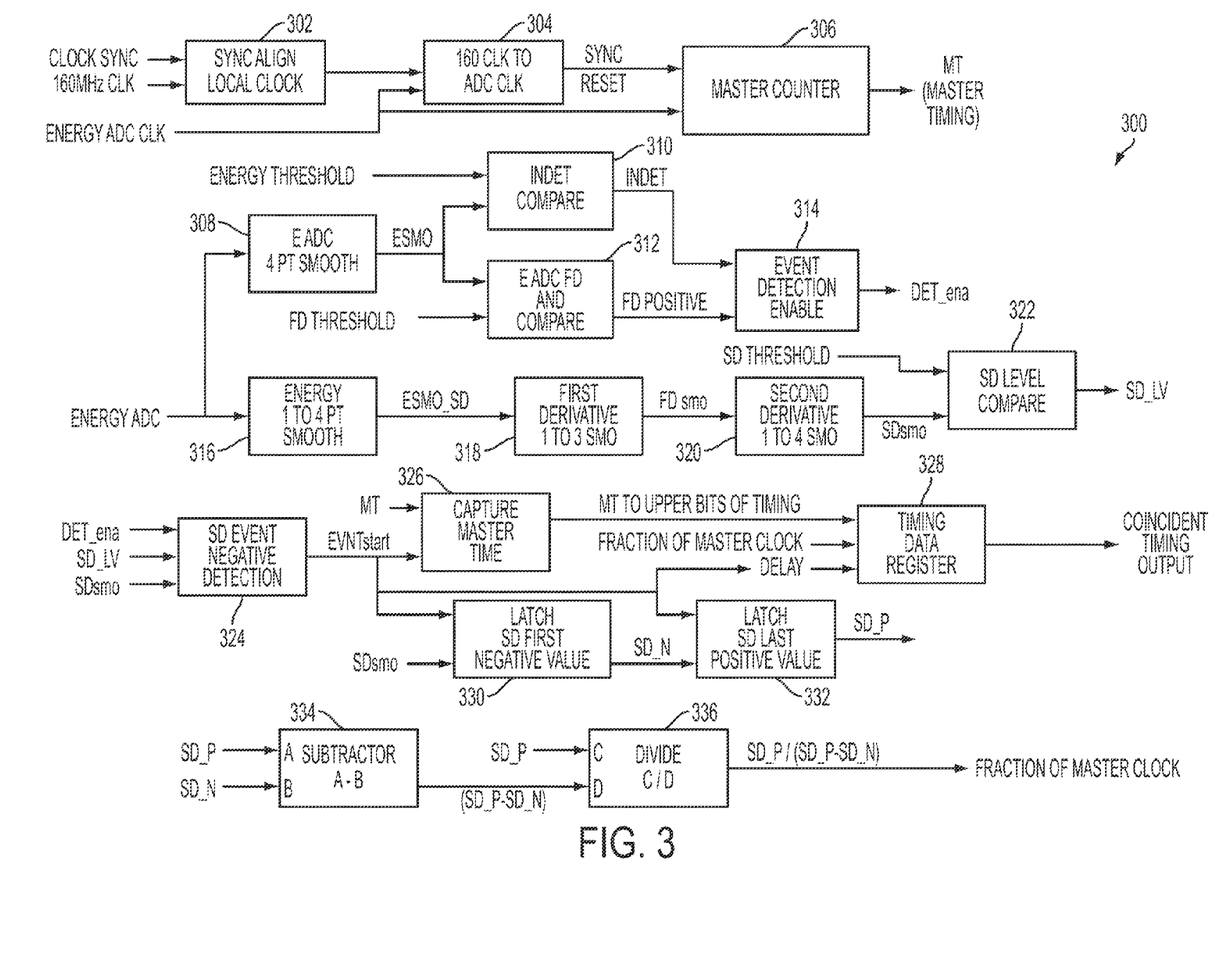
FIG. 3 depicts an embodiment of an exemplary logic circuit in accordance with this disclosure.

It is further noted that the method as shown in FIGS. 1 and 2 may be implemented in a number of different ways, such as by software, firmware, digital signal processing (DSP) or a hard-wired digital logic circuit as shown in FIG. 3, which is illustrated for purposes of explanation and exemplification only, and is not intended to restrict the scope of the present invention.

Returning to FIG. 1, of method 100. At step 101, a sample E SMO of the instantaneous E_SUM signal is obtained. FIG. 3 depicts an exemplary sample E SMO (see output of 308). Illustratively, the sample E SMO, depicted in FIG. 3, is the sum of three successive output values of the FADC, which may be further processed (e.g., by averaging, filtering or the like). Alternatively, E SMO may be only the instantaneous output of the FADC.

At step 103 of method 100, E SMO is compared with a preselected reference value, INDET LV (see FIG. 3), that is greater than the value of E_SUM from the photosensor devices when no light event is present, in order to distinguish the signal from the baseline of the photosensor devices. If E SMO is not greater than the reference value INDET LV, no event is considered to be present and processing returns to obtain the next E SMO sample.

If, at step 103, E SMO is greater than the reference value, the method 100 proceeds towards step 105. At step 105 the first derivative of E SMO is calculated (E FD in FIG. 3). If the first derivative is positive (indicating that E SMO is rising) as determined at step 107, then processing advances to step 109 where the second derivative of E SMO is calculated (E SD in FIG. 3). If however at step 107, the first derivative is negative, the method 100 returns to step 101 to obtain the next sample E_SUM signal.

At step 112, it is determined whether the second derivative E SD of sample E SMO has reached a maximum or peak value. This can be determined by comparing the instant second derivative value with the immediately preceding value, which can be stored in a buffer. Step 112 increases the likelihood that the second derivative E SD is large enough to be a result of an occurrence of an event and not a result due to noise. If an affirmative determination is made at step 112, the method 100 proceeds towards step 113. If however, a negative determination is made at step 112, the method 100 proceeds towards step 109.

At step 113, it is determined whether the second derivative E SD has returned to zero. If at step 113, it is determined that the second derivative E SD has returned to zero then the method 100 proceeds towards step 115. If however it is determined at step 113 that the second derivative E SD has not returned to zero then the method 100 remains at step 113 until the E SD has returned to zero then the method 100 proceeds towards step 115.

At step 115, an "event start" trigger signal is enabled (see "EVENT START" in FIG. 3), which accurately indicates the start time of a light event. The "event start" signal can be used to initiate further signal processing of the output signals from the photosensor devices for image construction. The method of digital detection of the start time of a light event as just described provides significantly better accuracy than the conventional analog method where an "event start" signal is simply triggered when the energy signal reaches a predetermined value, such as 40 mV.

One of the features of method 100, is determining when the second derivative has changed to/from a positive value to a negative value. For example, when the second derivative is above the preset level, the second derivative is positive. Thereafter, a determination is made whether the second derivative passes through zero. By passing through zero, the second derivative has changed from a positive value to a negative value. As an analog-to-digital converter samples the E_SUM and the second derivative E SD is computed, one sample of the second derivative E SD would be positive and the next sample of the second derivative E SD would be negative. In short, method 100 determines the point when the second derivative E SD passes through zero to determine the start of an event.

FIG. 2 is a flow diagram of a second preferred embodiment of the invention, wherein a method 200 is disclosed for detecting the occurrence of a light event even if there is a previous event still present in the E_SUM signal (in other words, in a pulse pile-up situation).

At step 201, a sample E SMO of the instantaneous E_SUM signal is obtained. The sample E SMO according to the illustrative embodiment shown in FIG. 3 is the sum of three successive output values of the FADC, which may be further processed (e.g., by averaging, filtering or the like). Alternatively, E SMO may be only the instantaneous output of the FADC.

At step 203, E SMO is compared with a preselected reference value, INDET LV (see FIG. 3), that is greater than the value of E_SUM from the photosensor devices when no light event is present, in order to distinguish the signal from the baseline of the photosensor devices. If E SMO is not greater than the reference value INDET LV, no event is considered to be present and processing returns to step 201 to obtain the next E SMO sample.

If, at step 203, E SMO is greater than the reference value E SMO, then at step 205 the first derivative of E SMO is calculated (E FD in FIG. 3). If the first derivative is positive (indicating that E SMO is rising) as determined at step 207, then processing advances to step 209 where the second derivative of E SMO is calculated (E SD in FIG. 3). If at step 207, the first derivative is not positive, processing returns to step 201 to obtain the next sample E_SUM signal.

At step 213, it is determined whether the second derivative E SD is above a preset threshold level EVENT LV (see FIG. 3) to avoid false triggering of the detector in response to noise.

At step 213, if the second derivative E SD is not above the preset level, then processing returns to step 209. If, at step 213, E SD is above the preset level, the process proceeds towards step 215.

At step 215 it is determined whether the second derivative has returned to zero. Once it has been determined that the second derivative E SD has returned to zero, the process proceeds towards step 217. If at step 215, the second derivative has not returned to zero, the process remains at step 215 until the second derivative E SD has returned to zero.

At step 217, the master clock values for the second derivative value before and after the zero crossing are acquired. Thereafter, the method 200 proceeds towards step 219.

At step 219, the information acquired in step 217 is used to calculate the clock fraction (i.e., the time it took from the start of the clock cycle to the point where the second derivative crossed through). The calculated clock fraction is added to the master clock time. Thereafter, the method 200 proceeds towards step 221.

At step 221, output event start and event start timing.

FIG. 3 is a general block diagram of a logic circuit 300 according to one preferred implementation of the method according to the invention. As shown, the circuit 300 is constructed of a logical connection of latch circuits, adders, subtractors, and comparators, which receive the input signal E_SUM and the various reference values. The combination of comparators, AND gate, and latch at the bottom of FIG. 3 is a circuit for determining whether the sample E SMO is outside of an acceptable energy range or window bounded by values EARLY LL and EARLY UL. If E SMO is outside of the energy window, then a DUMP signal is generated that causes the detector to discard the present E SMO value and to restart processing.

In this embodiment of the invention the value of the second derivative on the clock cycle just before and just after the second derivative passes through zero is used to determine a fractional part of the clock cycle that the event occurred in. This is done by (SD_P)/(SD_P−SD_N)  (Eq. 1)

where "SD_P" represents the second derivative of the clock value of an event when the clock value is positive; and "SD_N" represents the clock value of the second derivative at the next occurring event (which will have a negative value).

In positron emission tomography ("PET") imaging systems there is a ring of detectors surrounding a patient. In accordance with aspects of this disclosure, each detector has circuitry which has been re-configured to perform functions depicted in FIG. 3. There is a sync signal transmitted to each detector and synchronized with the master clock that is used to ensure that each master clock has the same time. The master clocks are run by energy ADC's that are generating a clock into the master counter 306. All of the Energy ADC's are clocked at the same time. As a result, greater accuracy is achieved when determining or analyzing an event from opposing detectors. Generally, the time of the event is the time from the master clock plus a fraction of the master clock time from the clock edge to the point where the second derivative passes through zero. The second derivative is used to determine the fraction of the master clock time.

Equation 1 is used to calculate distances above and below zero line (i.e., a transition distance from a positive value to a negative value).

Specifically, in FIG. 3, a sync align signal 302 and energy ADC Clk signal are transmitted towards a 160 Mhz to ADC clock converter 304. The clock converter 304 transmits a sync reset signal towards a master counter 306. The Master counter 306 receives the sync reset signal and the energy ADC Clk signal; and outputs a master time. Each detector 402 (depicted in FIG. 4 and further described below with respect to FIG. 4) contains circuitry for synchronization of time of all detectors. The master time is stored in a Capture Master Time latch 326.

An Energy ADC signal is transmitted towards both E ADC 308 and Energy 316.

The E ADC 308 "smoothes" the Energy ADC signal and transmits an Esmooth signal towards both INDET COMPARE 310 and E ADC FD and COMPARE 312. INDET COMPARE 310 receives both Esmooth signal and an energy threshold signal; determines whether Esmooth signal is above energy threshold signal; and transmits an INDET signal, towards an EVENT DETECTION ENABLE 314, indicative of whether the Esmooth signal is above the energy threshold signal. In addition to the Esmooth signal, E ADC FD and COMPARE 312 also receives a First Derivative THRESHOLD signal; determines whether the first derivative is positive; and generates an FD POSITIVE signal towards the EVENT DETECTION ENABLE 314. Upon receipt of both the INDET signal and the FD POSITIVE signal, the EVENT DETECTION ENABLE 314 transmits enable signal DET_ena.

ENERGY smooth 316 generates and transmits an Esmooth_SD signal towards FIRST DERIVATIVE 318. ENERGY smooth 316 smoothes the Energy ADC signal. The degree of smoothing by the Energy smooth 316 is (e.g., from 1 point to 4 points) dependent upon the level of noise in the Energy ADC signal. The FIRST DERIVATIVE 318 provides a 1 point to 3 point smooth; and transmits an FD smooth signal towards SECOND DERIVATIVE 320. The SECOND DERIVATIVE 320 provides a 1 point to 4 point smooth; and transmits an SD smooth signal towards SD LEVEL COMPARE 322. In addition to the SD smooth signal, SD LEVEL COMPARE 322 also receives an SD THRESHOLD signal. The SD LEVEL COMPARE 322 compares the received signals and transmits an SD_LV enable signal.

SD EVENT NEGATIVE DETECTION 324 receives enable signals DET_ena and SD_LV; and the SDsmo signal (an actual positive/negative value of the second derivative). When the SDsmo is negative, the SD NEGATIVE DETECTION 324 transmits an EVNTstart signal towards the Capture Master Time latch 326, a Latch SD First Negative Value 330, and Latch SD Last Positive Value 332. The SD NEGATIVE DETECTION 324 also transmits the EVNTstart signal (as a delay signal) towards a TIMING DATA register 328.

The Capture Master Time latch 326 transmits the master time to upper bits of the TIMING DATA register 328. The TIMING DATA register 328 uses the master time, Delay, and a Fraction of the Master Clock (discussed further below) to generate and transmit a Coincident Timing Output.

The Latch SD First Negative Value 330 receives the EVNTstart signal and the SDsmo signal to transmit an SD_N signal towards the Latch SD Last Positive Value 332. The Latch SD Last Positive Value 332 uses the SD_N signal and the EVNTstart signal to transmit an SD_P signal.

A Subtractor 334 receives the SD_P and SD_N signals; subtracts the SD_N signal from the SD_P signal; and transmits the difference towards a Divider 336. The Divider 336 divides a received SD_P signal by the received difference between the signals (i.e., SD_P–SD_N) to calculate and transmit the Fraction of the Master Clock. As indicated above, the Fraction of the Master Clock is transmitted to towards the Timing Data register 328.

Figure 4:
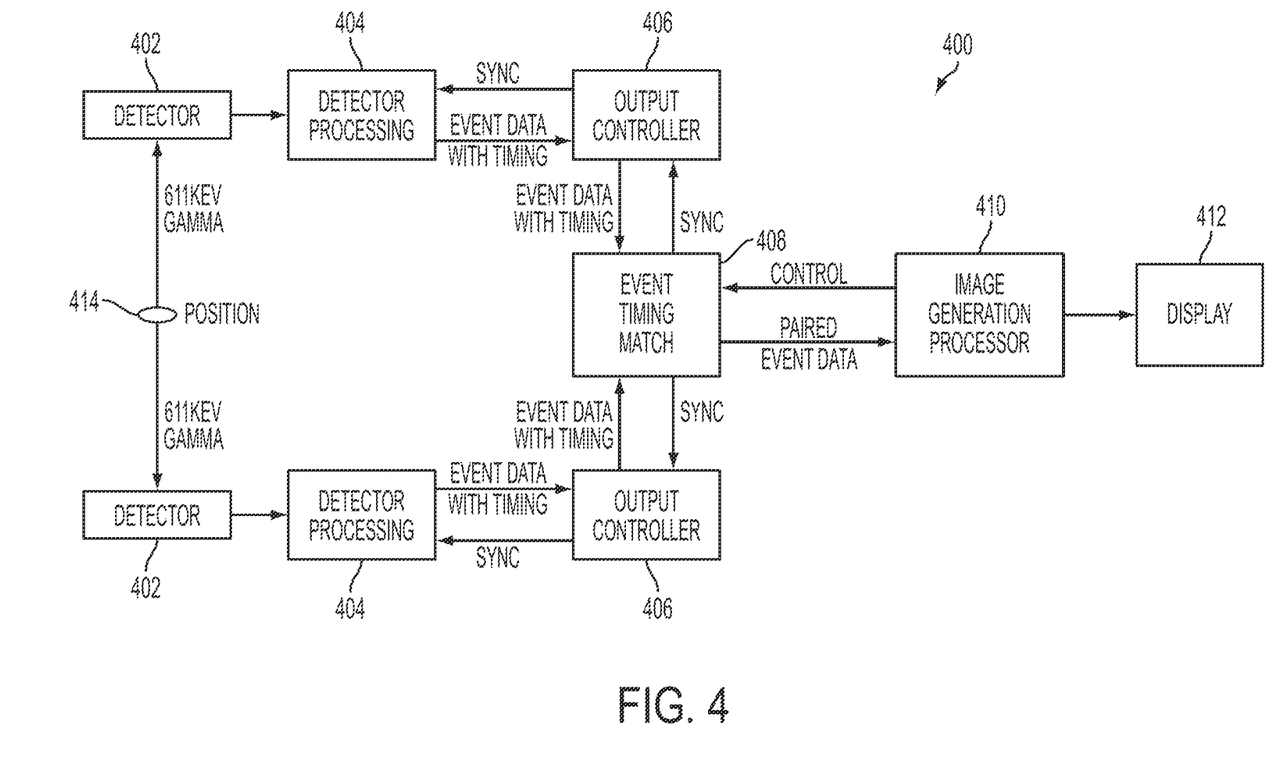
FIG. 4 depicts an embodiment of a high-level block diagram in accordance with this disclosure.

FIG. 4 depicts an embodiment of a high-level block diagram in accordance with this disclosure. Illustratively, the high-level block diagram is high-level block diagram of a PET system 400. There are opposing detectors 402 on either side of a patient. Embodiments, as described above, look for events which occurred simultaneously in opposing detectors 402. Each of the detectors 402 detects a positron 414. As explained above, each detector 402 transmits data received to its respective detector processor 404 for processing; synchronizes its master clock; and transmits EVENT DATA with timing of an event (e.g., towards an Output Controller 406). The Output Controller 406 receives time sync data from an EVENT TIMING MATCH module 408 and EVENT DATA with its timing from the DATA PROCESSOR 404; transmits the received sync data towards the DATA PROCESSOR 404 and the received EVENT DATA with its timing towards the EVENT TIMING MATCH module 408. The EVENT TIMING MATCH module 408 receives control signals from an IMAGE GENERATION PROCESSOR 410; uses the EVENT DATA to match corresponding events; and transmits the paired EVENT DATA (i.e., event data from corresponding detectors) towards the IMAGE GENERATION PROCESSOR 410. The IMAGE GENERATION PROCESSOR 410 transmits an image generated from the data towards the Display 412.

Figure 5:
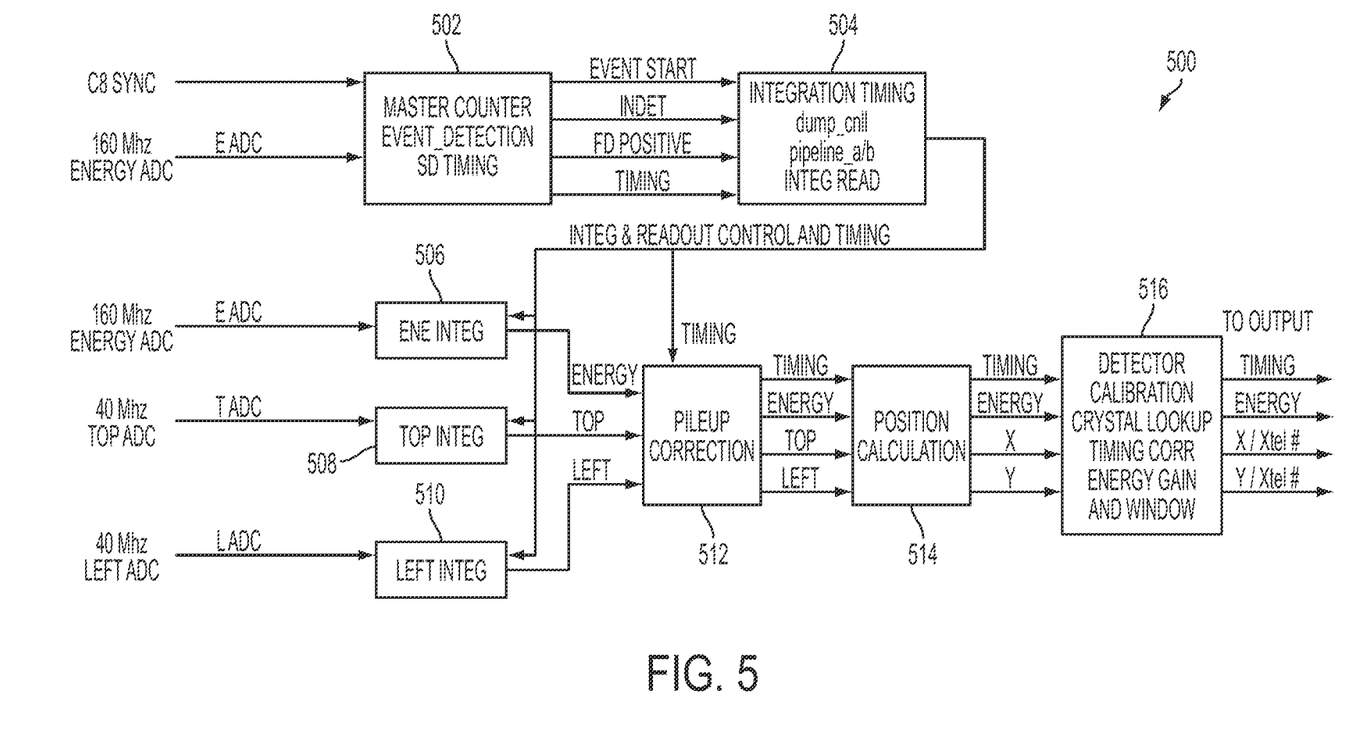
FIG. 5 depicts an embodiment of a exemplary event logic circuit in accordance with this disclosure.

FIG. 5 depicts an embodiment of an exemplary event logic circuit 500 in accordance with this disclosure. The event logic circuit 500 includes a MASTER COUNTER 502, INTEGRATION TIMING 504, ENE INTEG 506, TOP INTEG 508, LEFT INTEG 510, PILEUP CORRECTION 512, POSITION CALCULATION 514, and DETECTOR CALIBRATION 516 modules.

Figure 6:
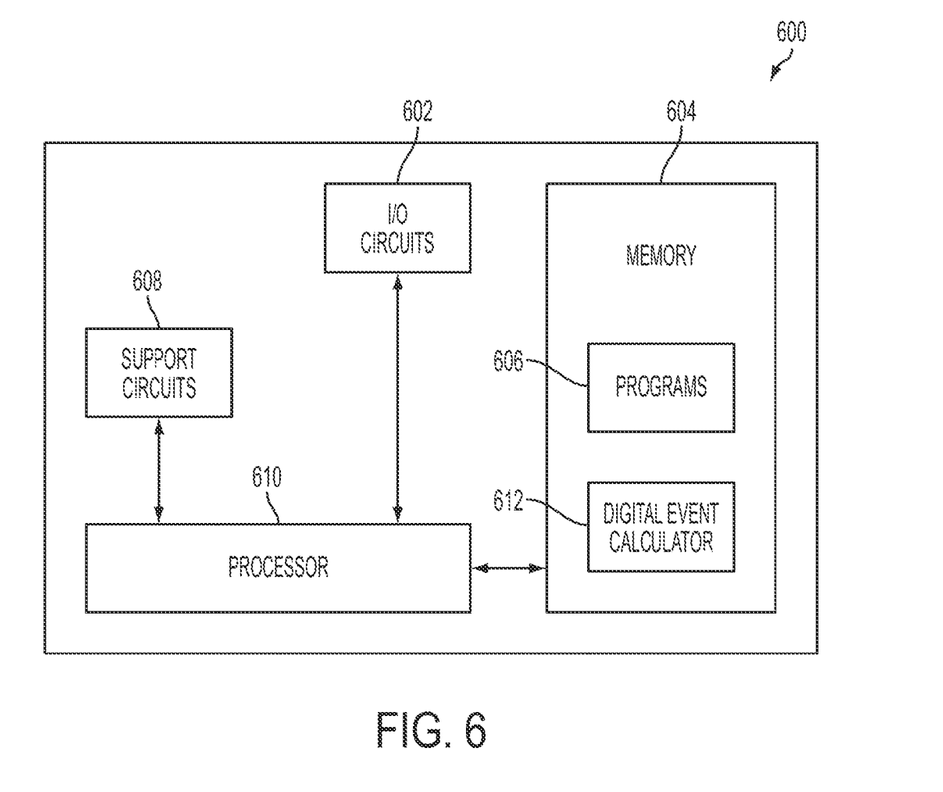
FIG. 6 depicts an embodiment of a high-level block diagram of a computer architecture used in accordance with aspects of the disclosure.

FIG. 6 depicts a high-level block diagram of a general-purpose computer architecture 600 for performing calculation of the time of an event. For example, the general-purpose computer 600 is suitable for use in performing the methods of FIGS. 1 and 2; and the logic circuit depicted in FIG. 3. The general-purpose computer of FIG. 6 includes a processor 610 as well as a memory 604 for storing control programs and the like. In various embodiments, memory 604 also includes programs (e.g., depicted as a "digital event calculator" 612 for calculating an occurrence of an event and an associated event time) for performing the embodiments described herein. The processor 610 cooperates with conventional support circuitry 608 such as power supplies, clock circuits, cache memory and the like as well as circuits that assist in executing the software routines 606 stored in the memory 604. As such, it is contemplated that some of the process steps discussed herein as software processes may be loaded from a storage device (e.g., an optical drive, floppy drive, disk drive, etc.) and implemented within the memory 604 and operated by the processor 610. Thus, various steps and methods of the present invention can be stored on a computer readable medium. The general-purpose computer 600 also contains input-output circuitry 602 that forms an interface between the various functional elements communicating with the general-purpose computer 600.

Although FIG. 6 depicts a general-purpose computer 600 that is programmed to perform various control functions in accordance with the present invention, the term computer is not limited to just those integrated circuits referred to in the art as computers, but broadly refers to computers, processors, microcontrollers, microcomputers, programmable logic controllers, application specific integrated circuits, and other programmable circuits, and these terms are used interchangeably herein. In addition, although one general-purpose computer 600 is depicted, that depiction is for brevity on. It is appreciated that each of the methods described herein can be utilized in separate computers.

Figure 7:
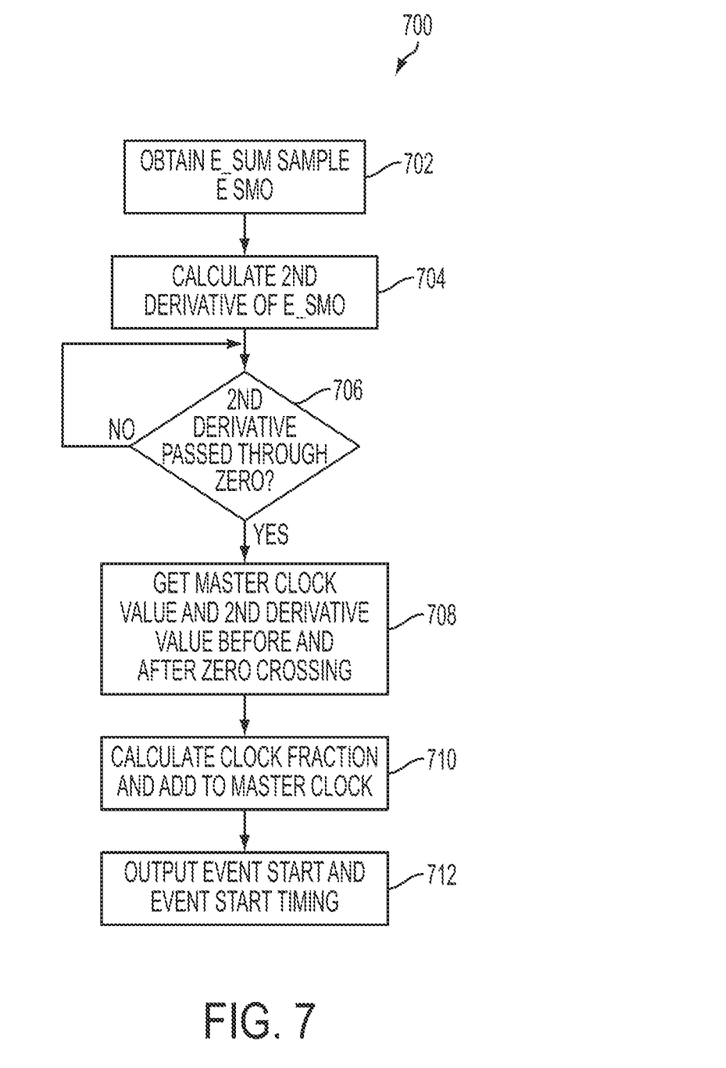
FIG. 7 depicts another flow diagram of an exemplary method according to another embodiment in accordance with this disclosure To facilitate understanding, identical reference numerals have been used, wherever possible, to designate identical elements that are common to the figures.

FIG. 7 is a flow diagram of a second preferred embodiment of the invention, wherein a method 700 is disclosed for detecting the occurrence of a light event even if there is a previous event is still present in the E_SUM signal (in other words, in a pulse pile-up situation).

At step 702, a sample E SMO of the instantaneous E_SUM signal is obtained. The sample E SMO according to the illustrative embodiment shown in FIG. 3 is the sum of three successive output values of the FADC, which may be further processed (e.g., by averaging, filtering or the like). Alternatively, E SMO may be only the instantaneous output of the FADC. Thereafter, the method 700 proceeds towards step 704.

At step 704, the second derivative of E SMO is calculated. Thereafter, the method 700 proceeds towards step 706.

At step 706, it is determined when the second derivative has returned to zero. Once it has been determined that the second derivative E SD has returned to zero, the process proceeds towards step 708.

At step 708, the master clock values for the second derivative value before and after the zero crossing are acquired. Thereafter, the method 700 proceeds towards step 710.

At step 710, the information acquired in step 708 is used to calculate the clock fraction (i.e., the time it took from the start of the clock cycle to the point where the second derivative crossed through). The calculated clock fraction is added to the master clock time. Thereafter, the method 700 proceeds towards step 712.

At step 712, output event start and event start timing.

The invention having been described, it will be apparent to those skilled in the art that the same may be varied in many ways without departing from the spirit and scope of the invention. In particular, while the invention has been described with reference to photomultiplier tube photosensor devices, the inventive concept does not depend upon the use of PMTs and any acceptable photosensor device may be used in place of a PMT. Further, any suitable gamma detector may be used in place of a scintillation crystal. Finally, the circuit of FIG. 3 is but one example of an implementation of the invention. As previously explained the digital event detection may be performed by a programmable computer loaded with a software program, firmware, ASIC chip, DSP chip or hardwired digital circuit. Any and all such modifications are intended to be included within the scope of the following claims.

While the foregoing is directed to embodiments of the present invention, other and further embodiments of the invention may be devised without departing from the basic scope thereof, and the scope thereof is determined by the claims that follow.

What is claimed is:

1. A method of determining the start time of a gamma interaction in a nuclear imaging detector, comprising the steps of:
    obtaining a digital sample of an energy signal from said nuclear imaging detector;
    calculating a second derivative of said digital sample;
    determining when said second derivative passed through a zero crossing point;
    determining master clock values for the second derivative before the second derivative has passed through the zero crossing point and after the second derivative has passed through the zero crossing point;
    calculating a clock fraction and adding said clock fraction to said master clock values, wherein said clock fraction represents a start of a clock cycle before and after said second derivative passes through the zero crossing point; and
    outputting the gamma interaction and the start time of the gamma interaction.

2. The method of claim 1, further comprising the step of determining whether said digital sample exceeds a first predetermined threshold prior to calculating said second derivative.

3. The method of claim 1, further comprising the steps of:
    calculating a first derivative of said digital sample; and
    determining whether said first derivative is positive prior to calculating said second derivative.

4. The method of claim 1, wherein said obtaining step comprises the step of summing a preselected number of successive outputs of an analog-to-digital converter coupled to outputs of photosensors of said nuclear imaging detector.

5. The method of claim 1, wherein said calculating of said clock fraction comprises:

$$(SD\_P)/(SD\_P-SD\_N),$$

wherein SD_P represents said second derivative of said clock value of an event when said clock value is positive and SD_N represents said clock value of said second derivative at a next occurring event.

6. A computer-readable medium having stored thereon a plurality of instructions, the plurality of instructions, when executed by a processor, cause the processor to perform the steps comprising of:
    obtaining a digital sample of an energy signal from a nuclear imaging detector;
    calculating a second derivative of said digital sample;
    determining whether said second derivative has passed through a zero crossing point;
    determining master clock values for the second derivative before the second derivative has passed through the zero crossing point and after the second derivative has passed through the zero crossing point;
    calculating a clock fraction and adding said clock fraction to said master clock values, wherein said clock fraction represents a start of a clock cycle before and after said second derivative passes through the zero crossing point; and outputting the gamma interaction and the start time of the gamma interaction.

7. The computer-readable medium of claim 6, further comprising:

determining whether a value of said sample is greater than a first preselected value, when said second derivative has passed through the zero crossing point;

determining whether an event signal was previously generated when a value of said sample was greater than a second preselected value, and triggering output of a pulse pile-up detection signal when results of said last two determining steps are affirmative.

8. The computer-readable medium of claim 6, further comprising:

determining whether said digital sample exceeds a first predetermined threshold prior to calculating said second derivative.

9. The computer-readable medium of claim 6, further comprising:

calculating a first derivative of said digital sample; and determining whether said first derivative is positive prior to calculating said second derivative.

10. The computer-readable medium of claim 6, further comprising:

summing a preselected number of successive outputs of an analog-to-digital converter coupled to outputs of photosensors of said nuclear imaging detector.

11. The computer-readable medium of claim 6, wherein said calculating of said clock fraction comprises:

(SD_P)/(SD_P−SD_N), wherein SD_P represents said second derivative of said clock value of an event when said clock value is positive and SDN represents said clock value of said second derivative at a next occurring event.

12. A circuit for determining the start time of a gamma interaction in a nuclear imaging detector, comprising:

a first circuit adapted to obtain a digital sample of an energy signal from a nuclear imaging detector;

a second circuit adapted to calculate a second derivative of said digital sample;

a third circuit adapted to determine when said second derivative has passed through a zero crossing point;

a fourth circuit adapted to determine master clock values for the second derivative before the second derivative has passed through the zero crossing point and after the second derivative has passed through the zero crossing point, calculate a clock fraction and add said clock fraction to said master clock values, wherein said clock fraction represents a start of a clock cycle before and after said second derivative passes through the zero crossing point; and a fifth circuit adapted to output the gamma interaction and the start time of the gamma interaction.

13. The circuit of claim 12, further comprising:

a sixth circuit adapted to determine, subsequent to said second derivative having returned to the zero crossing point, whether a value of said sample is greater than a first preselected value;

a seventh circuit adapted to determine subsequent to said second derivative having returned to the zero crossing point, whether an event signal was previously generated when a value of said sample was greater than a second preselected value; and an eighth circuit adapted to trigger output of a pulse pile-up detection signal when results of said last two determinations are affirmative.

14. The circuit of claim 12, further comprising:

a ninth circuit adapted to determine whether said digital sample exceeds a first predetermined threshold prior to calculating said second derivative.

15. The circuit of claim 12, wherein said calculating of said clock fraction comprises:

(SD_P)/(SD_P−SD_N), wherein SD_P represents said second derivative of said clock value of an event when said clock value is positive and SD_N represents said clock value of said second derivative at a next occurring event.

16. The circuit of claim 12, further comprising:

means for calculating a first derivative of said digital sample and determining whether said first derivative is positive prior to calculating said second derivative.

17. The circuit of claim 12, wherein said means for obtaining comprises means for summing a preselected number of successive outputs of an analog-to-digital converter coupled to outputs of photosensors of said nuclear imaging detector.

* * * * *